United States Patent

Morris et al.

[15] 3,665,146

[45] May 23, 1972

[54] APPARATUS FOR WELDING BRAKE SHOES

[72] Inventors: Thomas B. Morris, Montgomery; Fred Paul, Prattville; Barney R. Powell, Montgomery, all of Ala.

[73] Assignee: Standard Forge and Axle Company, Inc., Montgomery, Ala. by said Barney R. Powell

[22] Filed: Jan. 23, 1970

[21] Appl. No.: 5,199

[52] U.S. Cl.................................219/124, 219/127, 228/49
[51] Int. Cl.......................................................B23k 9/12
[58] Field of Search..................219/124, 127, 131, 159, 107, 219/91; 29/44, 48; 228/44, 47, 49

[56] References Cited

UNITED STATES PATENTS

| 1,550,651 | 8/1925 | Charter | 219/124 |
| 1,865,548 | 7/1932 | Whitworth | 188/250 |
| 1,898,923 | 2/1933 | Whitworth | 219/81 |
| 1,977,916 | 10/1934 | Nelson | 188/250 X |
| 2,041,461 | 5/1936 | Floyd et al. | 219/117 X |
| 2,081,811 | 5/1937 | Grenlich | 219/127 X |

Primary Examiner—J. V. Truhe
Assistant Examiner—J. G. Smith
Attorney—Mason, Fenwick & Lawrence

[57] ABSTRACT

An apparatus for welding the table section of a brake shoe to a pair of rib sections thereof including a frame assembly, support means mounted on the frame assembly, the support means having means for detachably mounting the rib sections in spaced, parallel relation thereon, the support means having means for detachably mounting the table section on the rib sections, welding means mounted on the frame assembly, directed toward selected adjacent portions of the table and rib sections mounted on the support means, means for advancing the support means along a predetermined line of travel whereby the welding means is directed toward the selected portions of the table and rib sections, and means for energizing the welding means to weld the table and rib sections together.

15 Claims, 10 Drawing Figures

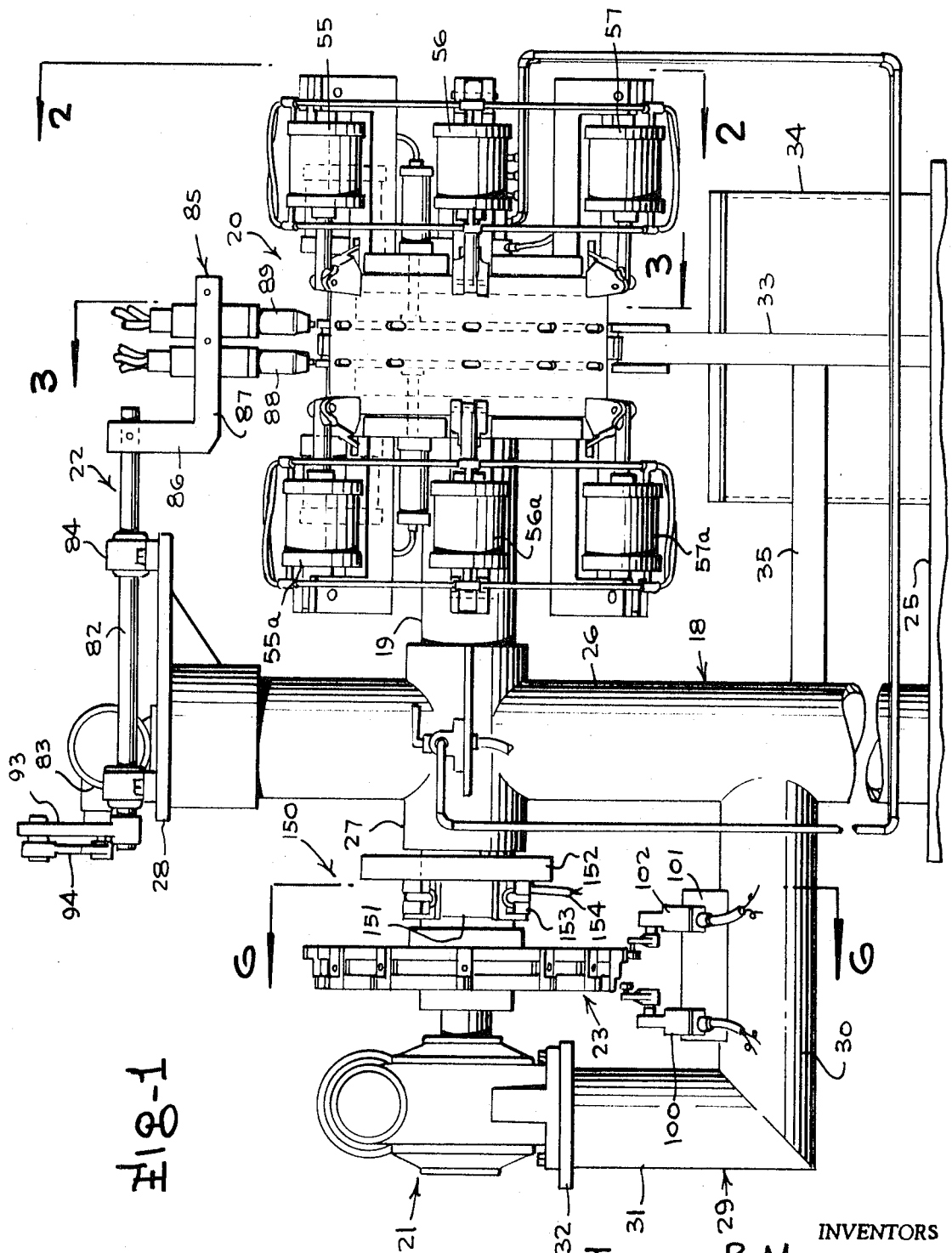

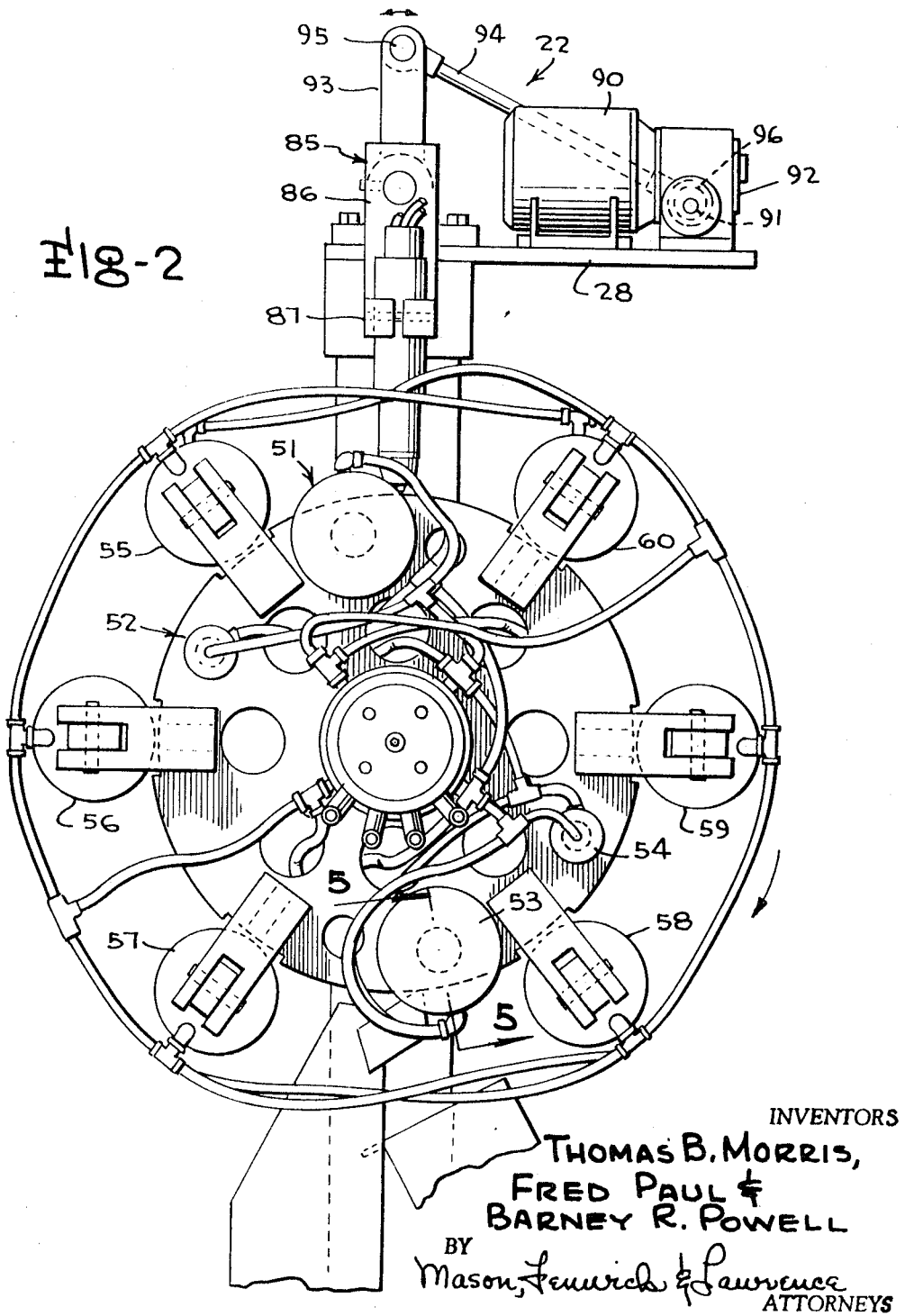

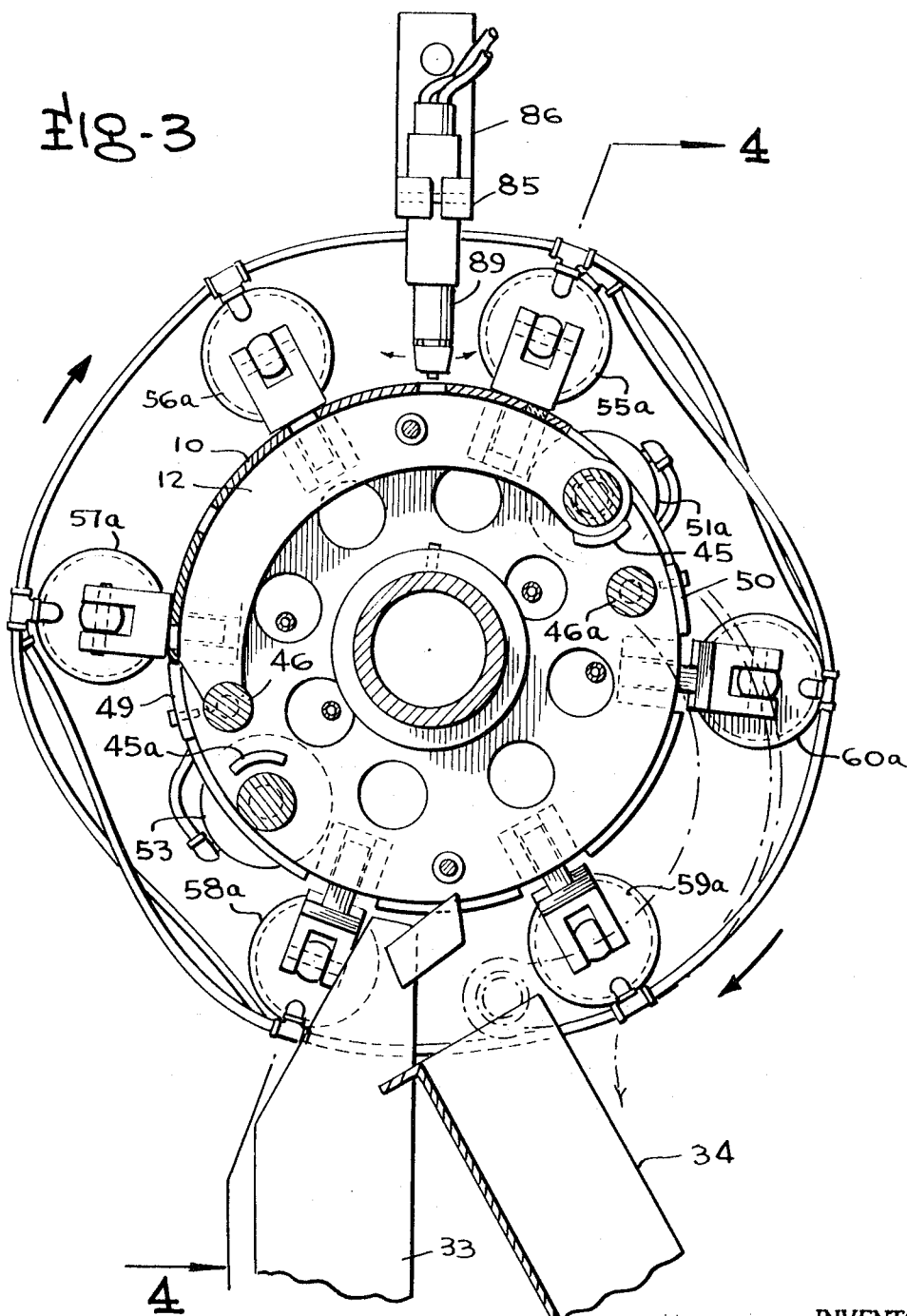

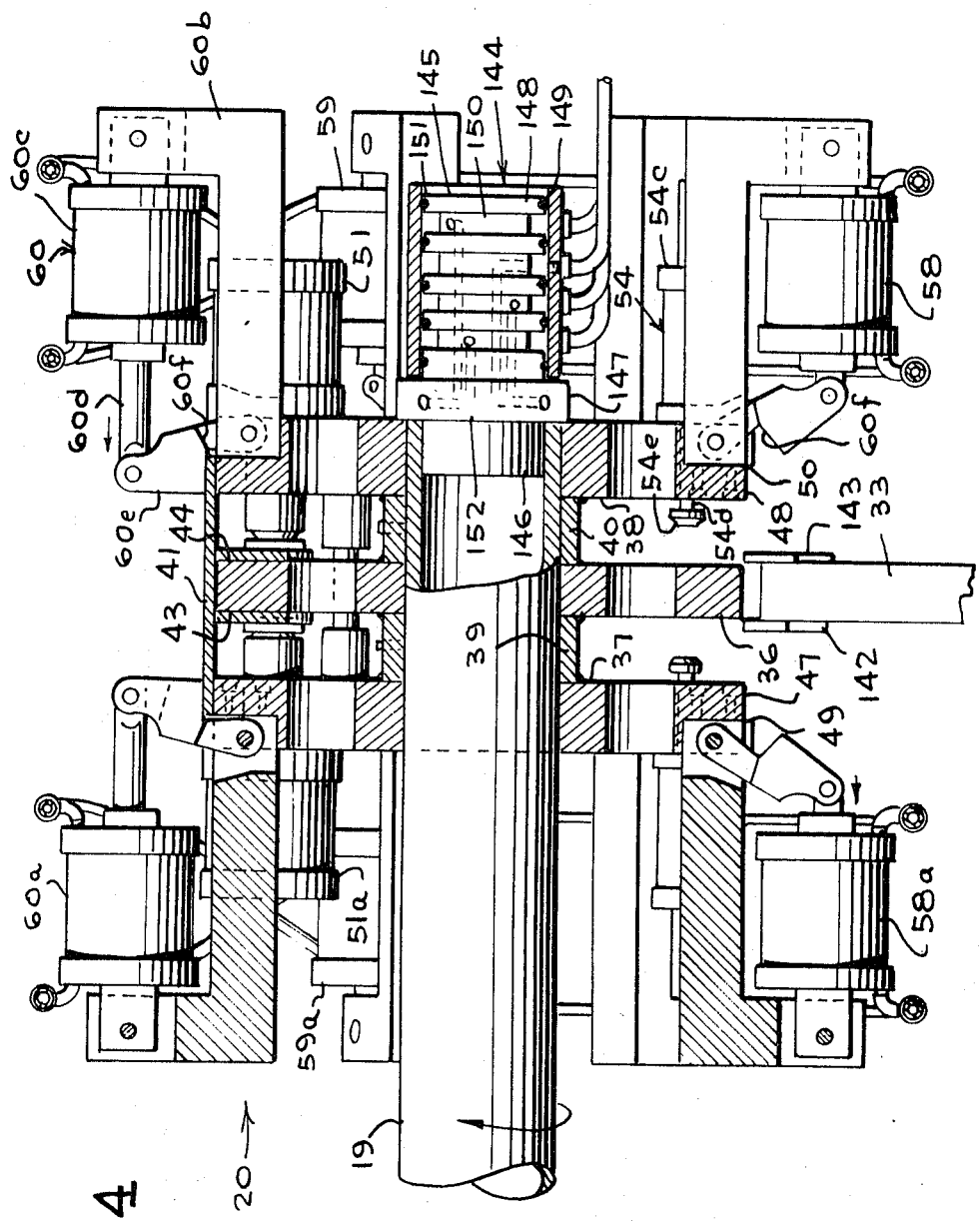

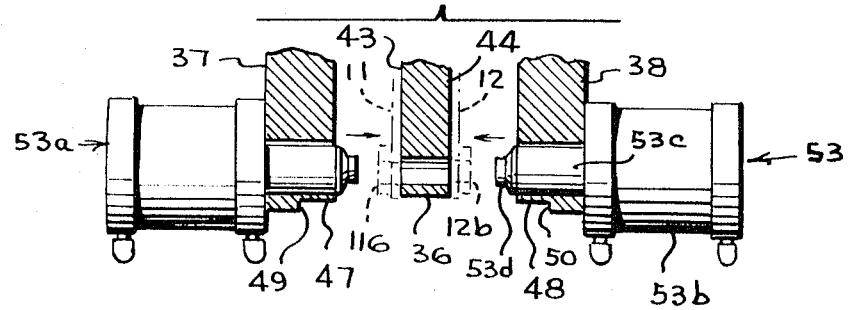
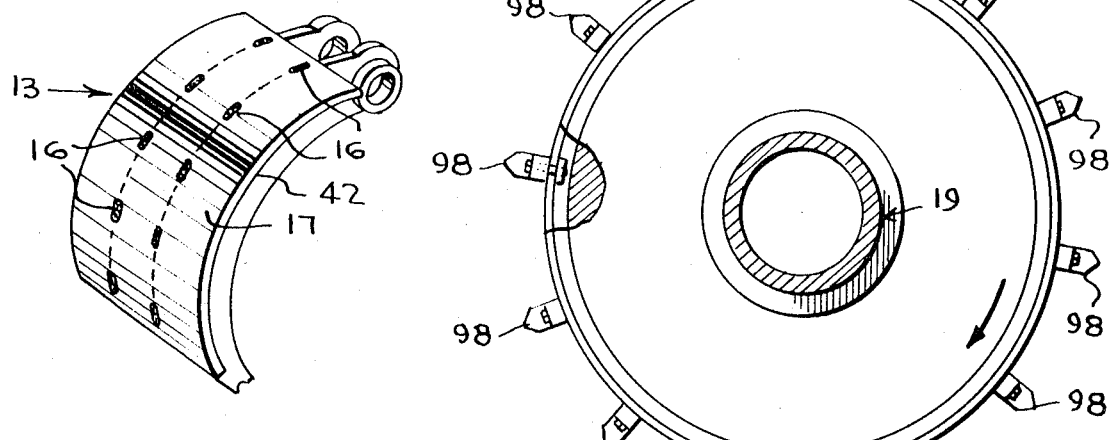
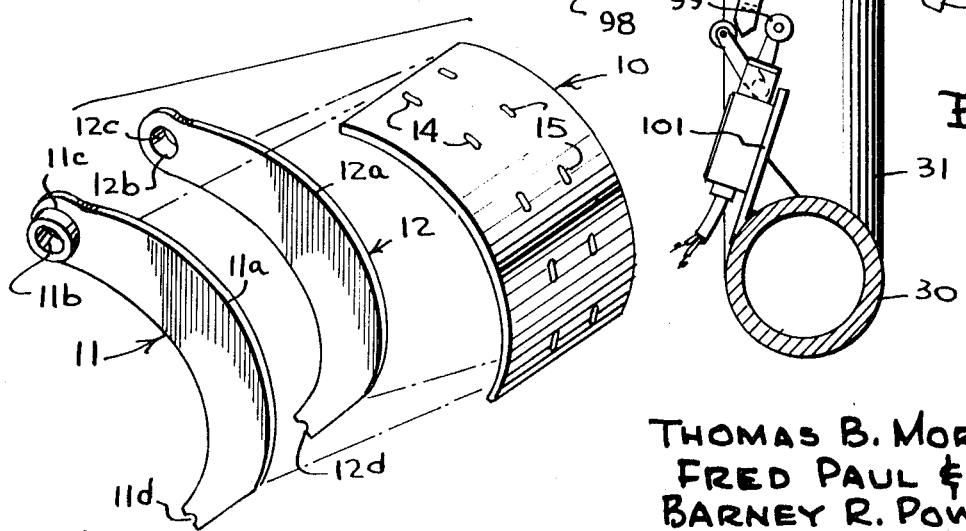

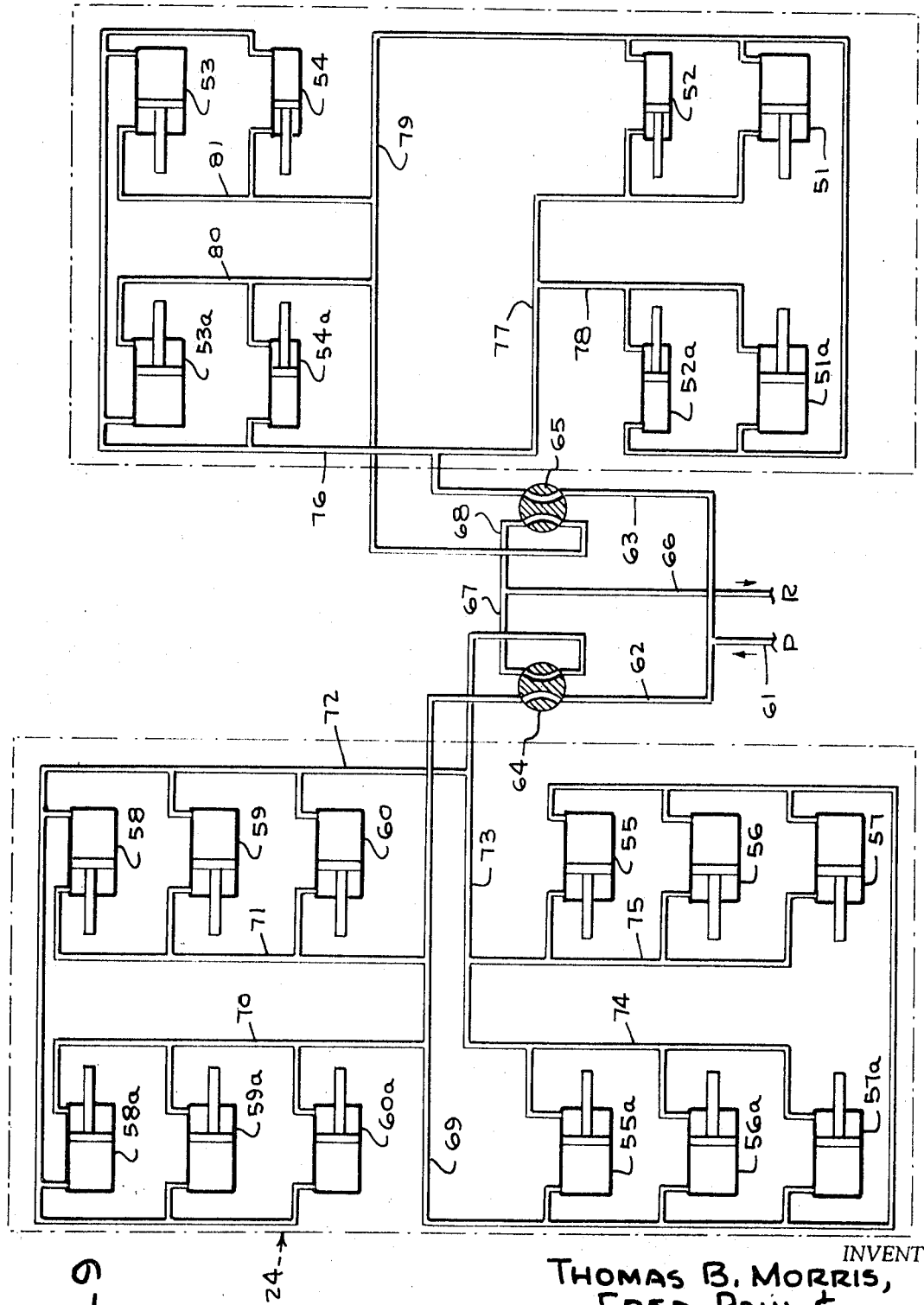

APPARATUS FOR WELDING BRAKE SHOES

This invention relates to a welding apparatus and more particularly to an apparatus for welding brake shoes for use in vehicle brake assemblies.

In the manufacture of brake assemblies for vehicles, it has been the common practice in the industry to produce brake shoes by initially casting the shoe, next machining the outer surface of the table section for mounting a block lining, and then machining the aligned openings in the rib sections which receive the mounting pins of a brake spider. Recently, it has been found that the use of fabricated brake shoes produced by welding a stamped and formed table section onto a pair of stamped rib sections, provides a brake shoe which is structurally satisfactory and more economical to produce than cast brake shoes, primarily due to the elimination of the amount of machining required with cast brake shoes. Such economy, however, can be realized only by complete automation of the fabrication of the brake shoes, including the stamping, forming and assembling of the brake shoes.

Accordingly, it is the principal object of the present invention to provide a novel welding apparatus.

Another object of the present invention is to provide a novel apparatus for welding brake shoes.

A further object of this invention is to provide a novel apparatus for welding the table section of a brake shoe onto the rib sections thereof.

A still further object of the present invention is to provide a novel apparatus for welding an arcuately shaped table section of a brake shoe having spaced parallel sets of openings along the length thereof, onto the arcuate upper edges of a pair of spaced parallel rib sections by plug welding through the openings in the table section when the openings in the table section are registered with the upper arcuate edges of the rib sections.

Another object of the present invention is to provide a novel apparatus for welding the table section of a brake shoe onto the rib sections thereof, which is comparatively simple in construction, easy to operate and relatively inexpensive to operate and service.

Other objects and advantages of the present invention will become more apparent to those persons skilled in the art to which the invention pertains, from the following description taken in conjunction with the accompanying drawings, wherein:

FIG. 1 is a front elevational view of an embodiment of the invention, having portions thereof broken away;

FIG. 2 is an enlarged cross-sectional view taken along line 2—2 in FIG. 1;

FIG. 3 is an enlarged cross-sectional view taken along line 3—3 in FIG. 1;

FIG. 4 is a cross-sectional view taken along line 4—4 in FIG. 3, having a portion thereof broken away;

FIG. 5 is a cross-sectional view taken along line 5—5 in FIG. 2;

FIG. 6 is an enlarged cross-sectional view taken along line 6—6 in FIG. 1, having a portion thereof broken away;

FIG. 7 is a perspective view of the components of a brake shoe adapted to be welded together in the embodiment illustrated in FIGS. 1 through 6, illustrating the components in exploded relation;

FIG. 8 is a perspective view of an assembled brake show welded together in the embodiment illustrated in FIGS. 1 through 6;

FIG. 9 is a diagrammatic-schematic view of the pneumatic control system for the embodiment of the invention illustrated in FIGS. 1 through 6.

Figure 10:
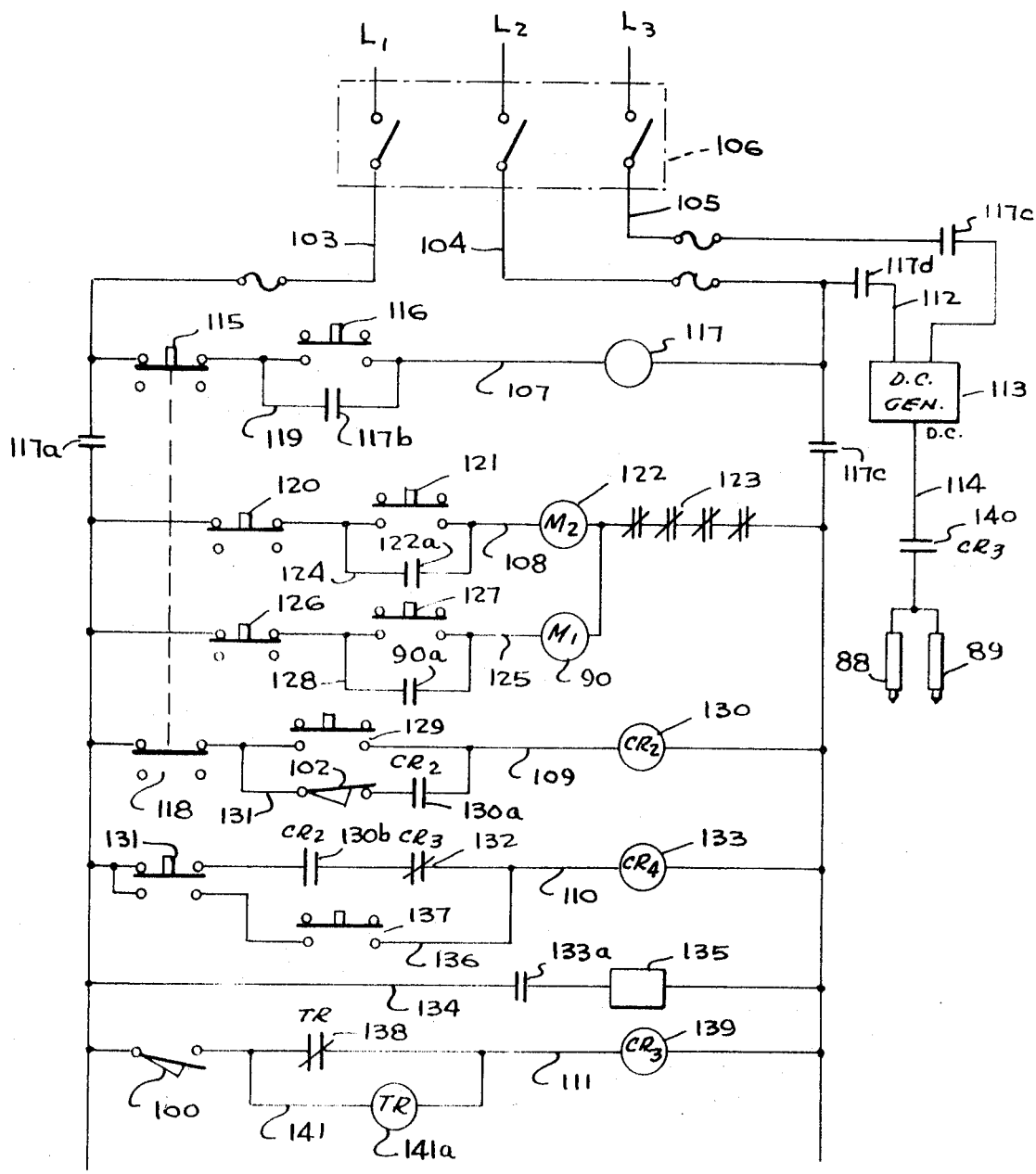
FIG. 10 is a schematic view of the electrical control system for the embodiment illustrated in FIGS. 1 through 6.

Briefly described, the present invention relates to an apparatus for welding an arcuately shaped table section of a brake shoe, having spaced parallel sets of openings along the length thereof, to a pair of rib sections thereof, having arcuate outer edges, comprising a frame assembly, a rotatable support means mounted on the frame assembly, and means for detachably mounting the rib sections in spaced, parallel relation on the support means whereby the spacing of the rib sections substantially is similar to the spacing between the openings in the table section and the outer edges of the rib section substantially lie in a cylindrical plane disposed coaxially with the axis of rotation of the support member. The apparatus further includes means mounted on the support means for detachably mounting the table section on the outer edges of the rib sections with the openings therein registered with the outer edges of the rib sections, welding means mounted on the frame assembly, means for indexing the support means to successively register the openings in the table section with the welding means, and means for energizing the welding means when the openings in the table section are registered therewith to plug weld the table section to the rib sections.

Referring to the drawings, FIGS. 1 through 6 illustrate an apparatus for welding a table section 10 onto a pair of rib sections 11 and 12, as illustrated in FIG. 7, to fabricate a brake shoe 13, as illustrated in FIG. 8. The rib section 11 generally has an arcuate configuration and includes an upper arcuately shaped edge 11a, an opening 11b having an annular flange 11c at one end thereof, and an arcuate recess lid at the opposite end thereof. The rib section 12 is similar in configuration to the rib section 11, and includes an arcuately shaped edge 12a, an opening 12b having a flange 12c at one end thereof, and an arcuate recess 12d at the opposite end thereof. The table section 10 has an arcuate shape and sets of spaced, parallel openings 14 and 15 disposed along the length thereof. The radii of curvature of the upper edges 11a and 12a of the rib sections and the bottom surface of the table section 10 are similar so that when the table section 10 is positioned on the upper edges 11a and 12a of the rib sections with the sets of openings 14 and 15 disposed in alignment with the outer edges 11a and 12a, the table section may be plug welded through the openings 14 and 15 to the upper edges 11a and 12a of the rib sections to form the brake shoe 13, as illustrated in FIG. 8.

Normally, the rib sections 11 and 12 would be formed by stamping and the table section 10 would be formed by stamping and forming. Subsequent to fabrication of the brake shoe 13, the weldments 16 would be ground even with the arcuate surface 17 of the table section for mounting a block lining, and the holes 11b and 12b, and the recesses 11d and 12d would be flame hardened. In the final product, as illustrated in FIG. 8, the openings 11b and 12b would be disposed in axial alignment and the recesses 11d and 12d would be disposed in alignment so that the lower end of the brake shoe may be mounted on an anchor pin of a brake spider in a brake assembly and the recesses 11d and 12d may engage the actuating cam of the brake assembly.

Referring to FIGS. 1 through 6, the apparatus for welding the table section 10 to the upper edges 11a and 12a of the rib sections 11 and 12 includes a frame assembly 18, a spindle 19 journaled in the frame assembly, a mounting head assembly 20 mounted on the spindle, a drive unit 21 for driving the spindle, a welding assembly 22 mounted on the frame assembly, a control unit 23 mounted on the spindle and frame assembly for operating the drive unit 21 and welding assembly 22, and a pneumatic control system 24 for operating the several units on the mounting head assembly for clamping the rib and table sections of a pair of brake shoes thereon.

The frame assembly 18 generally consists of a base member 25, a post member 26 having a horizontal cylindrical section 27 in which the spindle 19 is journaled, and a platform section 28 on the upper end thereof for supporting the welding assembly 22. The frame assembly further is provided with an arm member 29 including a horizontal section 30 disposed below and parallel to the spindle 19, and a vertical section 31 having a platform 32 disposed on the upper end thereof for supporting the drive unit 21. Also supported on the base member 25 is a support post 33 disposed below the mounting head assembly 20 and a chute 34 for receiving finished brake shoes ejected from the mounting head assembly. The post member 26 and support member 33 are rigidly interconnected by means of a horizontal brace member 35.

Referring to FIGS. 3 and 4, the mounting head assembly 20 includes an annular center mounting flange 36 rigidly secured to the spindle 19, and annular flanges 37 and 38 disposed on opposite sides of the center flange 36 which also are rigidly secured to the spindle 19. The annular flanges 37 and 38 are spaced from the center flange 36 by means of spacer sleeves 39 and 40. The center flange 36 is provided with a cylindrical outer surface 41 which is disposed coaxially with the spindle 19 and has a radius equal to the radius of curvature of the inner surface 42 of a table section 10. The center flange 46 further is provided with parallel side surfaces 43 and 44 which are disposed perpendicular to the axis of the spindle 19 and are spaced apart a distance equivalent to the desired spacing between the inner surfaces of rib sections 11 and 12 of a brake shoe 13.

As best illustrated in FIG. 3, the center flange 36 is provided with a first pair of laterally projecting, arcuately shaped elements 45, and a pair of circumferentially spaced, laterally projecting pins 46 which are adapted to seat the end portions of a pair of rib sections 11 and 12 so that the inner surfaces of the rib sections 11 and 12 engage the peripheral portions of surfaces 43 and 44 of the center flange 36, and the upper arcuate edges 11a and 12a of the rib sections are positioned parallel and slightly above a portion of the cylindrical surface 41 of the center flange. The portion of the circumference of the center flange 36 between the seating elements 45 and 46 defines a first work station on the mounting head assembly.

Similarly, the center flange 36 is provided with a second pair of curved seating elements 45a which are substantially diametrically opposed from the seating elements 45, and a second pair of seating pins 46a which are disposed diametrically opposite the first pair of seating pins 46. The pairs of seating elements 45a and 46a also are circumferentially spaced and positioned relative to the periphery of the center flange 36 for seating a second pair of rib sections 12 and 13, thus defining a second work station on the mounting head assembly. As is shown in FIG. 3, the seating pins 46 and 46a have a radius equivalent to the radius of the recesses 11d and 12d of the rib sections to accommodate the seating of the recessed ends of the rib sections on the seating pins 46 and 46a.

The annular flange members 37 and 38 are provided with cylindrical surfaces 47 and 48 which also are disposed coaxially with the spindle 19 and have a radii equivalent to the radius of curvature of the bottom surface 42 of a table section 10. As best illustrated in FIG. 3, the annular flange members 37 and 38 are provided with circumferentially spaced stop plates 49 and 50 for positioning a table section 10 at the first and second work stations on the upper arcuate edges 11a and 12a of a pair of rib members seated on elements 45 and 46 or elements 45a and 46a. The cylindrical surfaces 47 and 48 further are provided with annular shoulders 49 and 50 which are spaced apart a distance substantially equivalent to the width of a table section 10. The surfaces of shoulders 49 and 50 are disposed substantially perpendicular to the axis of the spindle 19 and are disposed relative to the side surfaces 43 and 44 of center flange 36 so that when a table section 10 is seated on cylindrical surfaces 47 and 48 between shoulders 49 and 50, the sets of openings 14 and 15 in the table section will register with the upper arcuate edges 11a and 12a of a pair of rib sections having the inner side surfaces thereof engaging the side surfaces 43 and 44 of the center flange 36 and the end portions thereof seated on seating elements 45 and 46 or elements 45a and 46a. Referring to FIG. 4, it will be noted that the shoulder surfaces 49 and 50 are annular to permit the mounting of a pair of table sections at the two work stations as described.

As best illustrated in FIGS. 1, 2, 4 and 9, the rib sections at the first work station are retained in position on the center flange 36 by means of retainer units 51 and 52 mounted on the annular flange 38, and retainer units 51a and 52a mounted on the annular flange 37. Similarly, the rib sections are positioned on the center flange 36 at the second work station by means of retainer units 53 and 54 mounted on the annular flange 38, and retainer units 53a and 54a mounted on the annular flange 37. The table section is positioned on the cylindrical surfaces 47 and 48 at the first work station, by means of retainer units 55, 56 and 57 mounted on the annular flange 38 and retainer units 55a, 56a and 57a which are mounted on the annular flange 37. Similarly, a table section is secured on annular surfaces 47 and 48 at the second work station, by means of retainer units 58, 59 and 60 mounted on the annular flange 38 and retainer units 58a, 59a and 60a which are mounted on the annular flange 37.

The retainer units 51 and 51a are disposed substantially in longitudinal alignment at the leading end of the first work station and the retainer units 52 and 52a also are substantially longitudinally aligned and are spaced circumferentially from the longitudinal axis of the retainer units 51 and 51a. Similarly, the retainer units 53 and 53a are substantially longitudinally aligned and are disposed at the leading end of the second work station. The retainer units 54 and 54a are substantially longitudinally aligned and are spaced circumferentially from the axis of retainer units 53 and 53a. The retainer units 55, 56 and 57 are circumferentially spaced relative to the axis of the spindle 19, and are substantially longitudinally aligned with retainer units 55a, 56a and 57a, as illustrated in FIG. 1. Similarly, retainer units 58, 59 and 60 are angularly spaced relative to the axis of spindle 19 and are substantially longitudinally aligned with retainer units 58a, 59a and 60a, respectively.

The retainer units 51, 51a, 53 and 53a are all substantially similar in construction and operate to clamp the forward ends of a pair of rib members 11 and 12 firmly into engagement with surfaces 43 and 44 of the center flange 36. Referring to FIG. 5, the retainer unit 53 consists of a pneumatic cylinder assembly including a fluid cylinder 53b rigidly secured to the annular flange 38 and a ram 53c having a reduced end portion 53d which is adapted to be received in the opening 12b of a rib section when the rib section is resting on seating elements 45a and 46a. The retainer units 52, 52a, and 54a also are similar in construction and operation, and function as supplementary means for clamping the rib sections 11 and 12 into firm engagement with the side surfaces 43 and 44 of the center flange 36. As best illustrated in FIG. 4, retainer unit 54 consists of a fluid cylinder assembly including a fluid cylinder 54c rigidly secured to the annular flange 38 and a ram 54d extending through an opening in the annular flange 38 and having an enlarged head portion 54e engageable with a rib section 12 positioned on the center flange 36.

The retainer units 55 through 60a also are all of a similar construction and function to clamp table sections 10 on the cylindrical support surfaces 47 and 48 at the two work stations. A set of three of such retainer units is provided along each side of a work station to engage a table member 10 along the side edge thereof and clamp the table section in position relative to a pair of rib sections for the welding operation. As best illustrated in FIG. 4, the retainer unit 60, which is typical of retainer units 55 through 60a, includes an L-shaped bracket 60b having a horizontal arm portion rigidly secured to the annular flange 38 and a radially disposed arm portion for supporting a fluid cylinder assembly. The fluid cylinder assembly includes a fluid cylinder 60c pivotally connected to the radial arm portion of the bracket 60b and a piston 60d. The extension and retraction of the piston 60d operates to pivot a clamping member 60e which is pivotally connected at its outer end to the free end of the piston 60d and also pivotally connected at its lower end to the bracket member 60b. Upon actuating the fluid cylinder assembly, the clamping member 60e is adapted to pivot in a plane including the axis of the spindle 19, to move a planar surface 60f into and out of clamping engagement with the upper surface of a table section 10 seated on the cylindrical surfaces 47 and 48 of annular flange members 37 and 38.

FIG. 9 illustrates the pneumatic control system for operating the retainer units for clamping rib and table sections of a brake shoe at the work stations of the mounting head assembly 20, so that the spindle 19 may be indexed to position the components of a brake shoe into position to be welded by the welding assembly 22. The system is operable to selectively actuate retainer units for the rib sections and the table section at one work station while simultaneously deactivating the retainer units for the rib sections and table section of the other work station to eject a brake shoe which has just been welded. The system includes a pressure line 61 connected to a source of air under pressure, having a pair of branch circuits 62 and 63 connected to a pair of two-way valves 64 and 65, and a return line 66 connected to the two-way valves 64 and 65 by means of branch lines 67 and 68. The valve 64 is connected to the rear ends of the fluid cylinders for the units 55, 56, 57, 55a 56a and 57a by means of a fluid line 69. A pair of branch lines 70 and 71 connect the fluid line 69 with the front ends of the fluid cylinders for the units 58, 59, 60, 58a, 59a, and 60a. Similarly, a fluid line 72 interconnects the two-way valve 64 with the rear ends of the fluid cylinders for units 58, 59, 60, 58a, 59a, and 60a. Branch lines 73, 74 and 75 interconnect the fluid line 72 with the front ends of the fluid cylinders for units 55, 56, 57, 55a, 56a and 57a. It thus will be seen that when the two-way valve 64 is in the position as illustrated in FIG. 9 to communicate lines 62 and 69, and lines 67 and 72, fluid under pressure will be supplied to the rear ends of the fluid cylinders for the units 55 through 57a to extend the pistons thereof and also will be supplied to the front ends of the fluid cylinders for units 58 through 60a to retract the cylinders thereof. At the same time, the front ends of the fluid cylinders for units 55 through 57a and the rear ends of the fluid cylinders for the units 58 through 60a will be connected to the return line 66. Upon rotating the two-way valve 64 approximately 90° to communicate the branch line 62 with fluid line 73 and to communicate branch line 67 with fluid line 69, fluid under pressure will be supplied to the front ends of the fluid cylinders for units 55 through 57a to retract the pistons thereof, and to the rear ends of the fluid cylinders for units 58 through 60a to extend the pistons thereof.

The two-way valve 65 is connected to the rear ends of the fluid cylinders of units 53 through 54a by means of a fluid line 76. The two-way valve 65 also is connected to the front ends of the fluid cylinders for units 51 through 52a by means of a branch circuit 77 interconnecting the fluid line 76 and the front ends of the fluid cylinders for units 51 and 52, and branch line 78 interconnecting the fluid line 77 and the front ends of the fluid cylinders for units 51a and 52a. A fluid line 79 connects the two-way valve 65 to the rear ends of the fluid cylinders for the units 51 through 52a, which is provided with a pair of branch lines 80 and 81 to communicate the fluid line 79 with the front ends of the fluid cylinders for the units 53 through 54a.

With the valve 65 in the position as illustrated in FIG. 9, fluid under pressure will be supplied to the rear ends of the fluid cylinders for units 53 through 54a to extend the pistons thereof, and also will be supplied to the front ends of the fluid cylinders for the units 51 through 52a to retract the pistons thereof. At the same time, the valve 65 will be positioned to communicate the front ends of the fluid cylinders for units 53 through 54a and the rear ends of the fluid cylinders to the return line 66. Upon turning the valve for units 51 through 52a 65 approximately 90°, to intercommunicate lines 63 and 79, and lines 68 and 76, fluid under pressure will be supplied to the front ends of the fluid cylinders for units 53 through 54a to retract the pistons thereof and to the rear ends of the fluid cylinders for units 51 through 52a to extend the pistons thereof. Simultaneously, the rear ends of the fluid cylinders for units 53 through 54a and the front ends of the fluid cylinders for units 51 through 52a will be communicated with the fluid line 66.

Referring to FIGS. 1 and 2, the welding assembly 22 includes a shaft 82 which is journaled in a pair of brackets 83 and 84 which are rigidly secured to the platform section 28 on the upper end of the frame assembly 18. Rigidly secured to one end of the shaft 82 is a bifurcated arm member 85 having a section 86 disposed radially relative to the axis of the shaft 82 and a section 87 disposed substantially parallel to the axis of the shaft 82. Clamped between the portions of the arm section 87 is a pair of gun type welding units 88 and 89. The welding units 88 and 89 are disposed substantially radially relative to the axis of spindle 19 and have the lower ends thereof spaced apart a distance equivalent to the spacing between the sets of openings 14 and 15 in a table section 10 mounted at one of the work stations on the mounting head assembly. The lower ends of the welding units 88 and 89 are spaced relative to the axis of spindle 19 a radial distance slightly greater than the radial distance of the upper surface of a table section 10 mounted on the mounting head assembly, so that as a table section positioned on the mounting head assembly as illustrated in FIG. 1 is indexed, the lower ends of the welding units 88 and 89 are positioned immediately above a pair of holes 14 and 15 to plug weld the table section 10 to the rib sections 11 and 12.

Also mounted on the platform section 28 is a small motor 90 which drives an output shaft 91 through a gear reduction unit 92. The welding units 88 and 89 are adapted to be oscillated when energized to completely fill the oblong holes 14 and 15 in a table section, by means of a radial arm member 93 rigidly mounted on the end of the shaft 82 opposite the end thereof on which the arm member 85 is mounted, and a link 94 pivotally connected at one end thereof to the free end of the arm member 93 by means of a pivot pin 95 and eccentrically mounted at the other end thereof to the output shaft 91, as at 95. It will be appreciated that upon operation of the motor 90 the link 94 will operate to oscillate the arm member 93 and correspondingly the welding units 88 and 89.

The drive unit 21 consists of an electrical motor, a gear reducer and an electrically operated clutch and brake which may be selectively actuated to index the spindle 19 to register a pair of openings 14 and 15 with the lower firing ends of the welding units 88 and 89. The operation of the electrically operated clutch and brake of the drive unit, the welding units 88 and 89 and the motor 90 is controlled by the control unit 23 which consists of an index wheel 97 rigidly secured to the spindle 19 for rotation therewith. As best illustrated in FIGS. 1 and 6, the index wheel 97 is provided with a first set of dogs 98 and a second set of dogs 99 which are mounted about the perimeter thereof. The first set of dogs 98 are spaced circumferentially to correspond with the circumferential spacing of pairs of openings 14 and 15 on a pair of table sections 10 mounted in position on the mounting head assembly 20, and are adapted to engage and trip a microswitch 100 secured to a bracket 101 which is rigidly mounted on the horizontal section 30 of the arm member 29 of the frame assembly. The second set of dogs 99 are spaced 180° apart, each between two sets of dogs 98, and are adapted to engage and trip a second microswitch 102 also mounted on the bracket 101. The positions of the dogs 99 correspond to those positions on the mounting head assembly 20 between the two work stations for the brake shoe components.

Referring to FIG. 10, there is illustrated an electrical control circuit for the welding apparatus. The system includes electrical supply lines 103, 104 and 105 which are connected to a master switch 106. Connected parallel across the supply lines 103 and 104 is a plurality of control circuits including a motor supply relay circuit 107, a spindle motor supply circuit 108, a cycle relay circuit 109, a clutch and brake relay circuit 110, and a welding supply relay circuit 111. The supply line 105 and a supply line 112 connected to the supply line 104 provide an input to a direct current generator 113 which supplies a direct current output to the welding units 88 and 89 by means of a welding supply circuit 114.

The motor supply relay circuit 107 is provided with a master stop switch 115, a master start switch 116 and a motor supply relay 117. The master stop switch 115 is mechanically linked to a stop switch 118 in the clutch and brake relay circuit 109, and is manually operable to simultaneously break the motor supply relay circuit 107 and the clutch and brake relay circuit 109. The motor supply relay 117 is adapted to be energized to close a normally open switch 117a in the supply line 103, a normally open switch 117b and a hold circuit 119 connected in parallel across the master start switch 116, which normally is in the open position, normally open switch 117c in the supply line 104, and normally open switch 117d and 117e in supply lines 112 and 105, respectively. It will be seen that upon depressing the master start switch 116, the relay 117 will be energized to close switches 117a through 117e to apply voltages to the supply circuits 103, 104, 112 and 105, and also to close the holding circuit 119 to maintain the relay 117 energized after the master stop switch 116 has been released.

The motor supply circuit 108 is provided with a stop switch 120, a start switch 121, a drive motor 122 for the spindle, and a set of overload switches 123. Upon depressing the motor start switch 121, the motor 122 will be energized to drive the spindle when the electrically operated clutch has been energized and engaged. The operation of the spindle motor 122 also operates to close a switch 122a in a hold circuit 124 connected across the motor start switch 121 to maintain the spindle motor 122 energized when the motor start switch 121 has been released. Also connected in parallel with the spindle motor 122 is an oscillating motor supply circuit 125 which is provided with a stop switch 126, a motor start switch 127 and the oscillating motor 90. Depressing the motor start switch 127 will energize the motor 90 to oscillate the welding units 88 and 89. The operation of the motor 90 also will close a switch 90a in a hold circuit 128 connected across the motor start switch 127 to maintain the oscillating motor 90 energized when the motor start switch 127 has been released.

The cycle relay circuit 109 is provided with the stop switch 118, a cycle start switch 129 and a clutch and brake relay 130. When the cycle start switch 129 is depressed, the cycle relay 130 will be energized to close switches 130a provided in a hold circuit 131 connected across the cycle start switch 129, and to close contacts 130b in the clutch and brake relay circuit 110. The cycle relay 130 will remain energized after the cycle start switch 129 has been released by the hold circuit 131 unless the microswitch 102 in the hold circuit has been tripped open by one of the dogs 99.

In addition to the switch 130b, the clutch and brake relay circuit 110 includes a stop switch 131, a normally closed switch 132 and a clutch and brake relay 133. It will be noted that upon closing switches 130b, the relay 133 will be energized to close a switch 133a in a clutch and brake supply circuit 134, including the electrically operated clutch and brake assembly 135. A by-pass circuit 136, including the switch 131 and a normally open switch 137 is connected across switches 130b and 132. It will be seen that upon depressing switches 131 and 137 the clutch and brake relay 133 may be energized to engage the clutch and thereby drive the spindle.

The welding supply relay circuit 111 includes the microswitch 100 which is normally disposed in the open position, a switch 138 which is normally closed, and a welding supply relay 139. Whenever one of the dogs 98 on the index wheel engages and closes the microswitch 100, the welding supply relay 139 will be energized to close switch 140 in the supply circuit 114 for the welding heads 88 and 89 to operate the welding heads. Energization of the welding supply relay 139 also will operate to open the switch 132 in the clutch and brake relay circuit 110 to de-energize the relay 133 and disengage the clutch 135 and apply the brake thereof to stop the rotation of the spindle. A circuit 141 having a timer 141a is connected across the switch 138 so that when the microswitch 100 is closed, the timer will be energized. The timer 141 is adapted to open the switch 138 after a predetermined time, to break the welding supply current 111.

In the operation of the embodiment of the invention illustrated in the drawings, the master switch 106 is closed to apply a voltage to the supply lines 103, 104 and 105. With the mounting head assembly being rotated to position the first workstation before the operator, a pair of rib sections 11 and 12 are positioned on the mounting head assembly with the inner surfaces thereof engaging the peripheral portions of surfaces 43 and 44 of the center flange 36, the front ends thereof resting on the laterally projecting arcuately shaped elements 45, the rear end portions thereof seated on the laterally projecting pins 46, and the upper arcuate edges 11a and 12b of the rib members disposed parallel and slightly above a portion of the cylindrical surface 41 of the center flange. The valve 65 is then rotated approximately 90° from the position illustrated in FIG. 9 to supply fluid under pressure to the rear ends of the cylinders of retainer units 51 through 52a to firmly clamp the rib sections 11 and 12 to the surfaces 43 and 44 of the center flange 36. A table section 10 is then placed on the cylindrical surfaces 47 and 48 of the annular flange members 37 and 38 with the lower end thereof abutting the stop plate 49 to position the table member 10 relative to the rib sections 11 and 12 with the sets of openings 14 and 15 registering with the upper arcuate edges 11a and 12a of the rib sections. The table section 10 is secured and positioned relative to the rib sections 11 and 12 by positioning the valve 64, as illustrated in FIG. 9, to supply fluid under pressure to the back sides of the cylinders of retainer units 55 through 57a, thereby clamping the table member along the side edges thereof to the cylindrical surfaces 47 and 48 of annular flanges 37 and 38.

After the components of a brake shoe have thus been mounted on the mounting head assembly, the master start switch 116 is depressed to energize the spindle motor relay 117 and close switches 117a through 117e. The closing of switches 117a and 117c will apply a voltage to supply lines 103 and 104. The closing of switch 117b will close the hold circuit 119 for the relay 117, and the closing of switches 117d and 117e will energize the direct current generator 113 for the welding supply circuit 114. The operator then depresses motor start switches 121 and 127 in sequence to energize the spindle motor 122 and the oscillating motor 90. The closing of switches 122a and 90a will maintain energization of the motors 122 and 90 by means of the hold circuits 124 and 128. The apparatus is then ready to begin its first cycle.

The apparatus is cycled by depressing the cycle start switch 129 to energize the clutch and brake relay 130. The relay 130 operates to close the switch 130a to complete the hold circuit 131, and close contact 130b to energize the clutch and brake relay 133. Energization of the relay 133 operates to close switch 133a, thus energizing the electrically operated clutch 135. Immediately, the clutch engages to transmit drive from the motor 122 to the spindle 19.

As the spindle begins to rotate, the first dog 98 in sequence will engage and close the microswitch 100, thus energizing the welding supply relay circuit 111. The relay 139 will then operate to open switch 132, thus breaking the clutch and brake relay circuit 110 to stop the spindle, and close switch 140 to energize the welding units 88 and 89. As previously mentioned, when a dog 98 engages and closes the microswitch 100 to energize the welding supply circuit 111 and correspondingly de-energize the clutch and brake relay circuit 110, a set of openings 14 and 15 in the table section 10 will be positioned directly below the welding units 88 and 89 to receive a bead of weld therein. During the plug welding phase, the motor 90 will be energized to oscillate the welding heads 88 and 89, thus moving them along the oblong shapes of the openings 14 and 15.

The closing of the microswitch 100 also energizes the timer 141. When a predetermined time has lapsed, the timer 141 will operate to open switch 138 and thus de-energize the welding supply circuit 111. As soon as this occurs, the welding supply circuit relay 139 is de-energized to permit switch 140 to open and switch 132 to close. Such action will operate to de-energize the welding heads 88 and 89 and again energize the clutch and brake supply circuit 110 and resume the rotation of the spindle 19 to index the mounting head assembly to the next welding station. This occurs when the next dog 98 in sequence engages and closes the microswitch 110 to energize the welding supply relay circuit 111 which correspondingly de-energizes the clutch and brake supply relay circuit 110 while energizing the welding supply circuit 114. The timer 141 eventually will de-energize the welding supply relay circuit 111 and correspondingly, energize the clutch and brake relay circuit 110 while de-energizing the welding supply circuit 114 to cause the spindle to rotate again to index the mounting head assembly to the next welding station. Such procedure is repeated automatically until each set of openings 14 and 15 are positioned below the welding units 88 and 89 and the table section is plug welded to the rib members at each welding station. As previously indicated, the dogs 98 are circumferentially spaced so that each time a dog 98 engages and trips the microswitch 100, a set of openings 14 and 15 will be positioned at the welding station below the welding units 88 and 89.

The welding cycle for the brake shoe will be completed when a dog 99 engages and opens microswitch 102, thus de-energizing the clutch and brake relay circuit 109. At such time, the second work station will be positioned before the operator to receive the components of a second brake shoe. At the same time, the first working station will be positioned behind the mounting head assembly above the chute 34.

A second pair of rib sections 11 and 12 are then mounted at the second work station, so that the inner surfaces thereof engage the peripheral portions of the surfaces 43 and 44 of the center flange 36, the forward ends thereof engage the second pair of curved seating elements 45a and the rear ends thereof rest on the second pair of seating pins 46a. With the ribs thus positioned, the valve 65 is positioned as illustrated in FIG. 9 to supply fluid to the rear ends of the cylinders of retainer units 53 through 54a and to the front ends of the cylinders 51 through 52a to clamp the rib sections positioned at the second work station and simultaneously release the rib sections of the welded brake shoe positioned at the first work station.

A table section 10 is then mounted on the cylindrical surfaces 47 and 48 of flanges 37 and 38 with the lower edge thereof engaging the lower stop 50 to position the table member relative to the rib sections, so that the sets of openings 14 and 15 will register with the upper arcuate edges 11a and 12a of the rib sections positioned on the second work station. To secure the table section on the second work station, the operator rotates the valve 64, 90° from the position as illustrated in FIG. 9 to supply fluid under pressure to the rear ends of the cylinders for the retainer units 58 through 60a, and to the front ends of the cylinders for the retainer units 55 through 57a. Correspondingly, the table member positioned on the second work station will be clamped and the table section at the first work station will be unclamped. The welded brake shoe released from the first work station then will be caused to drop onto the chute 34. In the event the welded brake shoe remains temporarily lodged to the center flange 36, subsequent rotation of the mounting head assembly will cause the leading edges of the rib sections of the completed brake shoe to engage a pair of brackets 142 and 143 rigidly secured to the upper end of the support post 33 which will cause the welded brake shoe to become dislodged and fall onto the chute 34. The mounting head assembly is then indexed and the table section is welded to the rib sections by repeating the cycle as previously described. The procedure of loading the mounting head assembly with the components of a brake shoe at one work station while simultaneously releasing a welded brake shoe at the second work station on the opposite side of the mounting head assembly, and the welding cycles can be repeated to continuously fabricate desired lots of brake shoes uninterruptedly.

As best illustrated in FIG. 4, the supply of air under pressure is transmitted from a set of stationary air lines on the frame assembly to the air lines on the mounting head assembly by means of a coupling assembly 144. The assembly includes a rotatable member 145 having a cylindrical portion 146 press-fit into the end of the tubular spindle 19, a collar portion 147 engaging the end portion of the spindle 19, and an elongated cylindrical portion 148 which is received within a cylindrical member 149 rigidly secured to the frame assembly. Each of the stationary lines communicates through a port in the stationary member 149 with an annular groove 150 in the reduced portion 148 of the rotatable member. A plurality of O-rings 151 seals each annular groove 150 from other grooves or the exterior of the stationary member 149. In addition, the collar section 147 and the reduced section 148 of the rotatable member are provided with internal passageways 152 which interconnect the annular grooves 150 with the stationary air lines, as illustrated in FIG. 2. It thus will be seen that air under pressure will flow through the stationary air lines and the cylindrical member 149 on the frame assembly, through the annular grooves 150 and the internal passageways 152 in the rotatable member to the rotatable air lines on the mounting head assembly.

It will be appreciated that the mounting head assembly and the control unit can be modified to accommodate brake shoe components of different sizes within limits. By changing the sizes of the flanges 36, 37 and 38 and adjusting the dogs on the index wheel, the components of different size brake shoes can be welded automatically on the embodiment of the invention illustrated in the drawings.

It further will be noted that the embodiment illustrated in the drawings is provided with a ground assembly 150 which includes an electrically conducting ring 151 mounted on the spindle 19, a stationary mounting ring 152 mounted on the cylindrical section 27 of the post member 26, and a set of brushes 153 mounted on the ring 152, in sliding contact with the rotatable ring 151. The set of brushes is electrically insulated from the frame assembly and is provided with a line 154 which functions to connect the welding heads 80 and 89 through the mounted shoe sections, the head assembly 20, the spindle 19 and the ring 151, to ground.

From the foregoing detailed description it will be evident that there are a number of changes, adaptations and modifications of the present invention which will come within the province of those skilled in the art. However, it is intended that all such variations not departing from the spirit of the invention be considered as within the scope thereof as limited solely by the appended claims.

We claim:

1. An apparatus for welding an arcuately shaped table section of a brake shoe, having spaced parallel sets of openings along the length thereof, to a pair of rib sections thereof, having arcuate outer edges, comprising a frame assembly, a rotatable support means mounted on said frame assembly, first means mounted on said rotatable support for rotation therewith for detachably mounting said rib sections in spaced, parallel relation on said support means whereby the spacing of said rib sections substantially is similar to the spacing between the openings in said table section and the outer edges of said rib section substantially lie in a cylindrical plane disposed coaxially with the axis of rotation of said support member, second means mounted on said support means for rotation therewith for detachably mounting said table section on the outer edges of said rib sections with the openings therein registered with the outer edges of said rib members, stationary welding means, independent of said first and second detachable mounting means, mounted on said frame assembly, means for indexing said support means to successively register said openings in said table section with said welding means and means for energizing said welding means when said openings in said table section are registered therewith to plug weld said table section to said rib sections.

2. An apparatus for welding an arcuately shaped table section of a brake shoe, having spaced parallel sets of openings along the length thereof, to a pair of rib sections thereof, having arcuate outer edges, according to claim 1, wherein said means for detachably mounting said table and rib sections comprise clamping means.

3. An apparatus for welding an arcuately shaped table section of a brake shoe, having spaced parallel sets of openings along the length thereof, to a pair of rib sections thereof, having arcuate outer edges, according to claim 2, wherein said clamping means are operated by fluid cylinder assemblies.

4. An apparatus for welding an arcuately shaped table section of a brake shoe, having spaced parallel sets of openings along the length thereof, to a pair of rib sections thereof, having arcuate outer edges, according to claim 1, wherein said support means includes abutment surfaces for positioning said rib sections and said table sections, and said means for detachably mounting said table and rib sections comprise clamping means.

5. An apparatus for welding an arcuately shaped table section of a brake shoe, having spaced parallel sets of openings along the length thereof, to a pair of rib sections thereof, having arcuate outer edges, comprising a frame assembly, a rotatable support means mounted on said frame assembly, having first and second work stations disposed on diametrically opposite sides thereof, each work station including first means mounted thereon for rotation therewith, having rib section engaging means movable in at least one plane passing through the axis of rotation of said rotatable support means, for detachably mounting said rib sections in spaced, parallel relation on said support means whereby the spacing of said rib sections substantially is similar to the spacing between the openings in said table section and the outer edges of said rib sections substantially lie in a cylindrical plane disposed coaxially with the axis of rotation of said support member, and second means mounted thereon for rotation therewith, having table section engaging means movable in at least one plane passing through the axis of rotation of said rotatable support means, for detachably mounting said table section on the outer edges of said rib sections with the openings therein registered with the outer edges of said rib members, stationary welding means, independent of said first and second detachable mounting means, mounted on said frame assembly, means for indexing said support means about its axis of rotation to successively register said openings in said table section with said welding means and means for energizing said welding means when said openings in said table section are registered therewith to plug weld said table section to said rib sections.

6. An apparatus for welding an arcuately shaped table section of a brake shoe, having spaced parallel sets of openings along the length thereof, to a pair of rib sections thereof, having arcuate outer edges, according to claim 5, wherein said means for detachably securing said table and rib sections at one of said work stations, are activated while the means of the other work station for detachably securing said rib and table sections is correspondingly deactivated.

7. An apparatus for welding an arcuately shaped table section of a brake shoe, having spaced parallel sets of openings along the length thereof, to a pair of rib sections thereof, having arcuate outer edges, according to claim 5, wherein said means for detachably securing said rib sections at one of said work stations is operable while the means for detachably securing the rib sections at the other of said work stations correspondingly is inoperable, and said means for detachably mounting said table section at said one work station is operable while the means for detachably mounting a table section at said other work station correspondingly is inoperable.

8. An apparatus for welding an arcuately shaped table section of a brake shoe, having spaced parallel sets of openings along the length thereof, to a pair of rib sections thereof, having arcuate outer edges, according to claim 5, wherein said means for detachably mounting said table and rib sections comprise clamping means.

9. An apparatus for welding an arcuately shaped table section of a brake shoe, having spaced parallel sets of openings along the length thereof, to a pair of rib sections thereof, having arcuate outer edges, according to claim 5, wherein said support means includes abutment surfaces for positioning said rib sections and said table sections and said means for detachably mounting said table and rib sections comprise clamping means.

10. An apparatus for welding an arcuately shaped table section of a brake shoe, having spaced parallel sets of openings along the length thereof, to a pair of rib sections thereof, having arcuate outer edges, comprising a frame assembly, a spindle rotatably mounted on said frame assembly, a mounting head assembly rigidly mounted on said spindle for rotation therewith, said mounting head assembly including at least one work station having a first set of abutment surfaces for mounting said rib sections in spaced parallel planes disposed normal to the axis of rotation of said spindle, with the outer edges thereof lying in a cylindrical plane disposed coaxially relative to the axis of said spindle, and a second set of abutment surfaces for mounting said table section on the outer arcuate edges of said rib sections with the sets of openings in said table section registered with the outer arcuate edges of said rib sections, said mounting head assembly having abutment surfaces for longitudinally aligning said rib and table sections, first means mounted on said mounting head assembly for rotation therewith for retaining said rib sections in engagement with said first set of abutment surfaces, each of said first retaining means having rib section engaging members disposed along an arc less than 360°, second means mounted on said mounting head assembly for rotation therewith for retaining said table section in engagement with said second abutment surfaces, each of said second retaining means having table section engaging members disposed along an arc less than 360°, a pair of stationary welding guns, independent of said first and second retaining means, disposed in planes including said rib sections positioned on said first set of abutment surfaces, means mounted on said frame assembly for indexing said spindle and mounting head assembly about the axis thereof to successively register openings in said table section with said welding guns, and means for energizing said welding guns upon registry of said openings in said table section with said welding guns to plug weld said table section to said rib sections.

11. An apparatus for welding an arcuately shaped table section of a brake shoe, having spaced parallel sets of openings along the length thereof, to a pair of rib sections thereof, having arcuate outer edges according to claim 10, wherein said mounting head assembly includes first and second work stations disposed on diametrically opposed sides thereof.

12. An apparatus for welding an arcuately shaped table section of a brake shoe, having spaced parallel sets of openings along the length thereof, to a pair of rib sections thereof, having arcuate outer edges, according to claim 11, wherein said means for retaining said table and rib sections at one of said work stations, are activated while the means for retaining said table and rib sections at the other work station, correspondingly is deactivated.

13. An apparatus for welding an arcuately shaped table section of a brake shoe, having spaced parallel sets of openings along the length thereof, to a pair of rib sections, having arcuate outer edges, according to claim 11, wherein said means for retaining said rib sections at one of said work stations is operable while the means for retaining said rib sections at the other of said work stations correspondingly is inoperable, and said means for retaining said table section at said one work station is operable while the means for retaining a table section at said other work station correspondingly is inoperable.

14. An apparatus for welding an arcuately shaped table section of a brake shoe, having spaced parallel sets of openings along the length thereof, to a pair of rib sections thereof, having arcuate outer edges, according to claim 10, wherein said means for retaining said table and rib sections comprise clamping means.

15. An apparatus for welding an arcuately shaped table section of a brake shoe, having spaced parallel sets of openings along the length thereof, to a pair of rib sections thereof, having arcuate outer edges, according to claim 10, wherein said means for retaining said table section comprises sets of clamping members engageable with the side portions of said table section to clamp said table section into firm engagement with said second set of abutment surfaces.

* * * * *